US009604685B2

(12) United States Patent
Schanz et al.

(10) Patent No.: US 9,604,685 B2
(45) Date of Patent: Mar. 28, 2017

(54) TRANSPORT DEVICE FOR FIXING TO A VEHICLE FRAME ELEMENT

(71) Applicant: TOURATECH AG, Niedereschach (DE)

(72) Inventors: Jochen Schanz, Niedereschach (DE); Herbert Schwarz, Niedereschach (DE)

(73) Assignee: Touratech AG (DE)

(*) Notice: Subject to any disclaimer, the term of this patent is extended or adjusted under 35 U.S.C. 154(b) by 0 days.

(21) Appl. No.: 14/761,118

(22) PCT Filed: Jan. 14, 2014

(86) PCT No.: PCT/EP2014/000070
§ 371 (c)(1),
(2) Date: Jul. 15, 2015

(87) PCT Pub. No.: WO2014/111248
PCT Pub. Date: Jul. 24, 2014

(65) Prior Publication Data
US 2015/0367902 A1 Dec. 24, 2015

(30) Foreign Application Priority Data

Jan. 17, 2013 (DE) .................. 10 2013 000 790

(51) Int. Cl.
B62J 9/00 (2006.01)
B62J 7/04 (2006.01)
(Continued)

(52) U.S. Cl.
CPC ........ *B62J 7/04* (2013.01); *B60R 9/10* (2013.01); *B62J 9/00* (2013.01); *B62J 9/001* (2013.01); *B62K 11/00* (2013.01)

(58) Field of Classification Search
CPC ......... B62J 7/04; B62J 7/08; B62J 9/00; B62J 9/001; B60R 9/10
(Continued)

(56) References Cited

U.S. PATENT DOCUMENTS 4,577,786 A * 3/1986 Dowrick .................. B62J 9/00
224/417
4,671,438 A * 6/1987 La Plante ................. B62J 9/00
224/430

(Continued)

FOREIGN PATENT DOCUMENTS

DE 102010005272 7/2011
EP 2500246 9/2012

(Continued)

Primary Examiner — Corey Skurdal
(74) Attorney, Agent, or Firm — Tarolli, Sundheim, Covell & Tummino LLP

(57) ABSTRACT

A transportation device for easy fixing to a vehicle frame element that includes at least two parallel struts. The transportation device includes a luggage accommodating region, at least one side part, and at least one first supporting element which is fixed to the side part. The transportation device also includes at least one second supporting element which is fixed to the side part, wherein, in a closed position of the second supporting element, at least one locking unit has a closed position configured to lock a latching member in a closed position of the second supporting element.

9 Claims, 6 Drawing Sheets

(51) Int. Cl.
*B60R 9/10* (2006.01)
*B62K 11/00* (2006.01)

(58) Field of Classification Search
USPC .................................................. 224/430, 431
See application file for complete search history.

(56) References Cited

U.S. PATENT DOCUMENTS

| | | | |
|---|---|---|---|
| 6,347,804 B1 | 2/2002 | Seibel | |
| 8,152,036 B2 * | 4/2012 | Visenzi | B62J 9/00 224/413 |
| 8,292,139 B2 * | 10/2012 | Golub | B62J 7/08 224/419 |
| 8,864,002 B2 * | 10/2014 | Iida | B62J 7/04 224/413 |
| 8,881,565 B2 | 11/2014 | Schanz et al. | |
| 9,056,641 B2 * | 6/2015 | Visenzi | B62J 9/001 |

FOREIGN PATENT DOCUMENTS

| | | |
|---|---|---|
| WO | 0112496 | 2/2001 |
| WO | 2007045371 | 4/2007 |
| WO | 2008014616 | 2/2008 |
| WO | 2011025390 | 3/2011 |
| WO | 2011088814 | 7/2011 |

* cited by examiner

Fig. 2

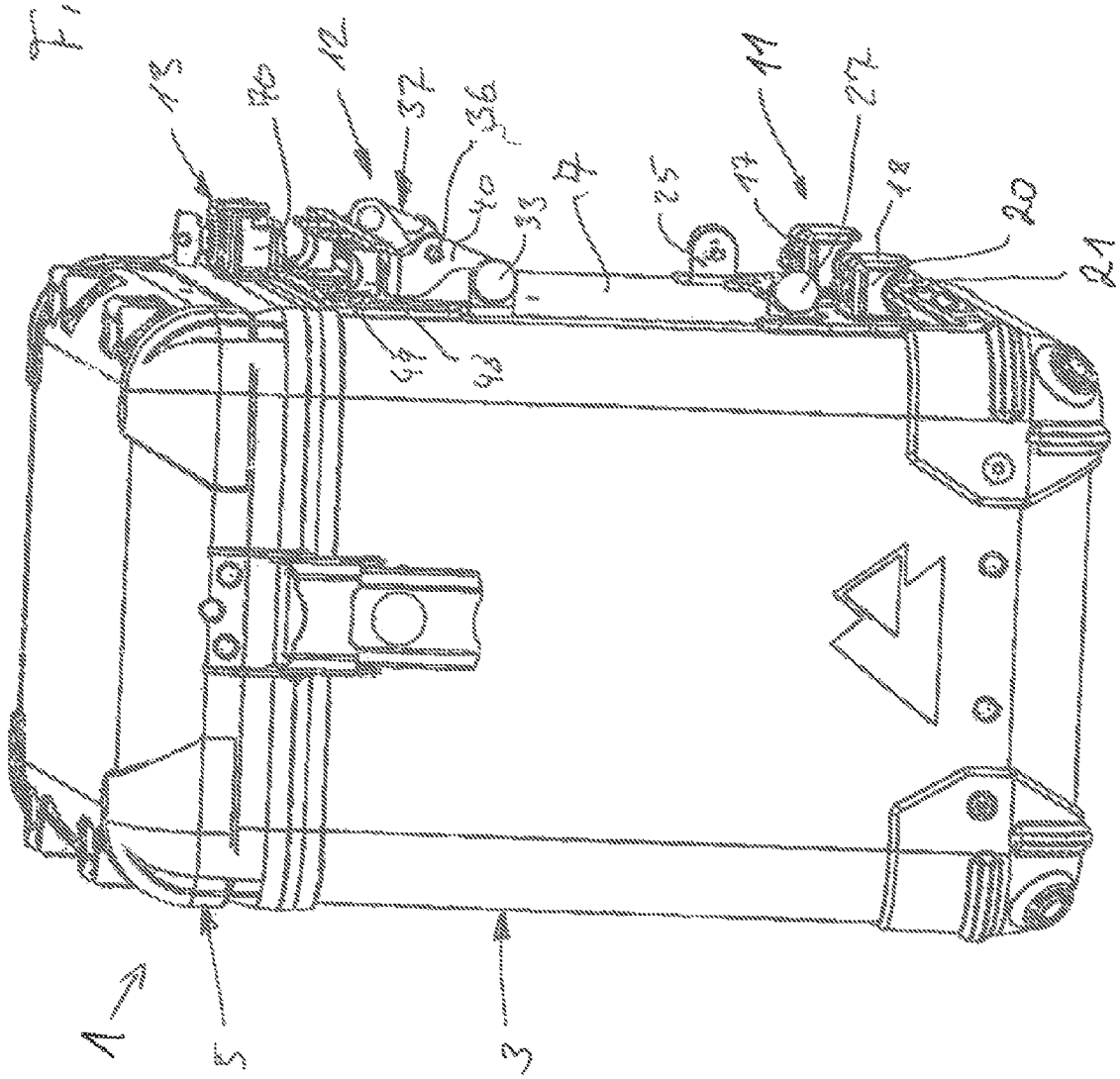

TRANSPORT DEVICE FOR FIXING TO A VEHICLE FRAME ELEMENT

RELATED APPLICATIONS

This application corresponds to PCT/EP2014/000070, filed Jan. 14, 2014, which claims the benefit of German Application No. 10 2013 000 790.9, filed Jan. 17, 2013 the subject matter of which is incorporated herein by reference in its entirety.

BACKGROUND OF THE INVENTION

The present invention relates to a transportation device for attachment to a vehicle frame element such as a motorcycle pannier bag for example. However, the transportation device could also be of another type such as a bicycle carrier or a roof box for example which is fastened to roof racks or to some other vehicle frame element.

DE 10 2010 005 272 for example describes a motorcycle pannier bag having a special locking system. In the case of the known motorcycle pannier bag, two oppositely directed supporting elements are clamped between two parallel struts of a vehicle frame element and then locked in this position by a movable latching member. The latching member is attached to the bag and is releasable by an actuating mechanism located within the bag.

Consequently, both the process of attaching that of releasing this bag are relatively complex and are always associated with a need to open the bag which is undesirable especially in clamp weather. Therefore, one object of the present invention is to provide a transportation device which simplifies the process of fixing it to a vehicle frame element comprising at least two parallel struts.

In accordance with the invention, this object is achieved by a transportation device according to claim 1. Further embodiments of the invention are apparent from the appendant claims.

Particularly, there is provided a transportation device for fixing to a vehicle frame element comprising at least two parallel struts, wherein the transportation device comprises a luggage accommodating region and at least one side part having a mounting device. The mounting device comprises at least one first supporting element which is fixed to the side part and comprises at least one first recess for at least partially accommodating a first one of the struts, wherein the first supporting element is fixed rigidly to the side part and wherein the first recess points in a first direction, at least one second supporting element which is fixed to the side part and comprises a second recess for at least partially accommodating a second one of the struts, wherein the second supporting element is fixed to the side part such as to be pivotal about a swivel pin in order to be movable between an opened and a closed position, wherein, in the closed position of the second supporting element, the second recess points in a second direction that is opposed by 180° to the first direction, and wherein, upon a movement between the opened and the closed position, the second supporting element is moved over the swivel pin as seen from the first supporting element, and at least one latching member which is fixed in a rigid relationship with the second supporting element and is pivotal therewith on the side part. Further, the transportation device comprises at feast one locking unit which is fixed to the side part and comprises a stationary part and a pivotal part, wherein the pivotal part is movable between a closed position and an opened position, and wherein, in the dosed position, it configured to lock the latching member in a closed position of the second supporting element. Such a transportation device facilitates simple mounting to corresponding parallel struts on a vehicle by simply inserting and swinging in, wherein it may be locked up in the swung-in or closed position. Due to movement of the second supporting element over the swivel pin, the transportation device is initially held in the swung-in position even when the locking unit is open since the clamp force between the struts increases in the beginning when the transportation device is swung out again.

In one embodiment the pivotal part of the locking unit is biased towards the closed position and is mounted on the side part in such a way that it contacts the latching member upon movement of the second supporting element from the opened position into the closed position, then moves into an opened position and subsequently returns automatically to the closed position in which it locks the latching member. Thus, an automatic locking while swinging-in the transportation device towards the struts may be achieved.

For providing security against unintentional opening of the transportation device and/or theft, the locking unit comprises a lock which is arranged in such a way that it prevents a movement between the stationary part and the movable part in a locked position and permits movement in an opened position.

Preferably, the locking unit and also the first and second supporting elements are fixed to the same side of the side part which points away from the luggage accommodating region. This facilitates simple access to the mounting device, the access being independent from the filling degree of the luggage accommodating region, and it is not necessary to open a possibly closed luggage accommodating region. For a simpler construction of the device, the latching member and the second supporting element era attached preferably to a common pivotal bracket.

In one embodiment, the first and/or the second supporting element consist at least partially of a resilient material or are mounted resiliency to the side part in order to permit a movement of the recess surface in the first and/or second direction. Thus, tolerances of the distances between the struts may be accommodated, and, further, crossing of the swivel axis during pivotal movement of the second support elements becomes easier.

In a preferred embodiment, the transportation device is a motorcycle pannier bag, which enables easy fixing and releasing with one hand. Also a combination of a vehicle and a vehicle frame element is advantageous, which comprises at least two parallel struts, and a transportation device as described above, wherein preferably the vehicle is a motorcycle.

BRIEF DESCRIPTION OF THE DRAWINGS

The invention is described in more detail hereinafter with reference to the drawings; in the drawings:

FIG. 2 a perspective rear view of the motorcycle pannier bag in accordance with FIG. 1 with the mounting device in the opened state;

FIG. 6 a perspective side view of the motorcycle pannier bag in accordance with FIG. 1 with the mounting device in a closed state.

DESCRIPTION

Figure 1:
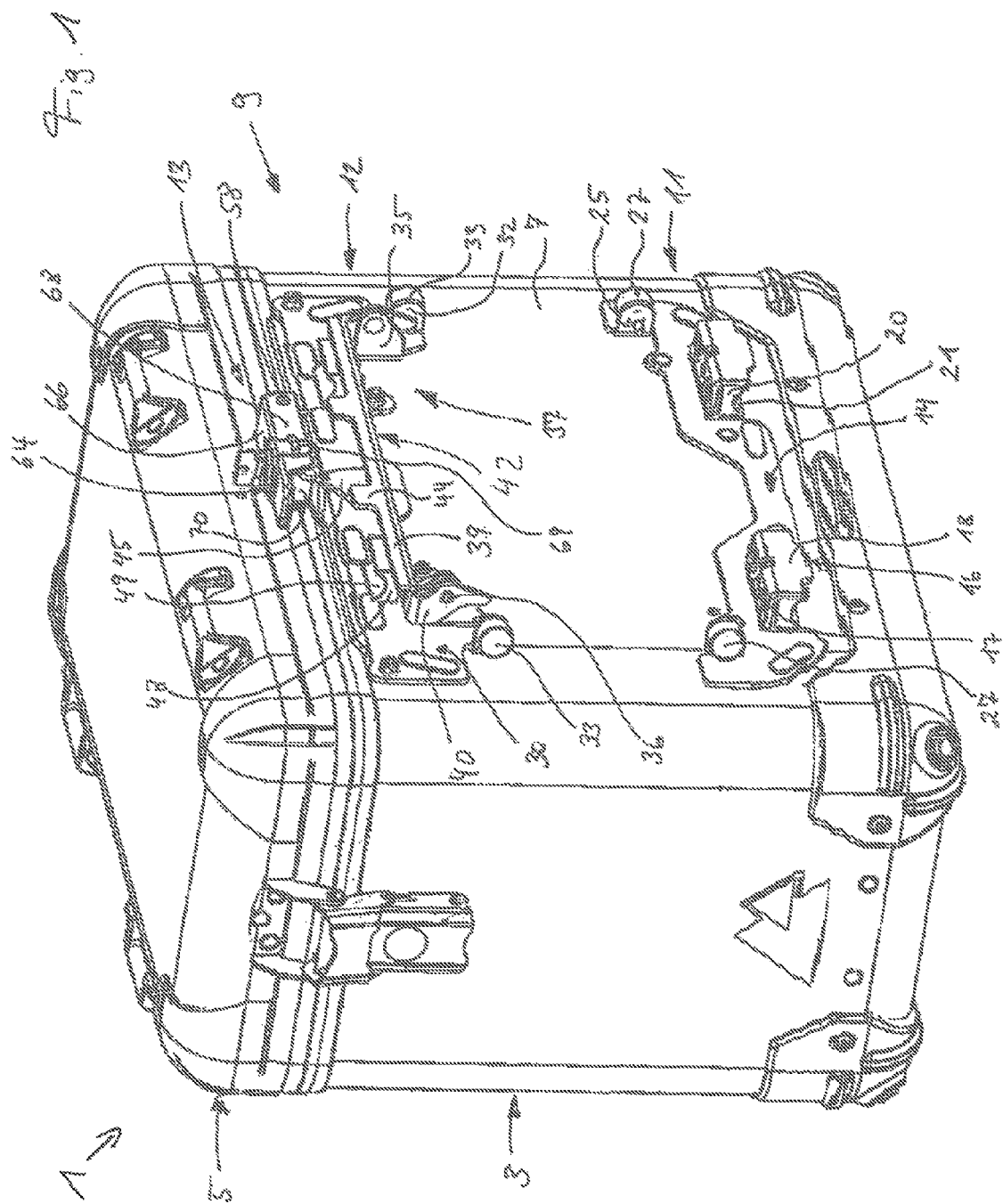
FIG. 1 shows a perspective rear view of a motorcycle pannier beg with a mounting device in a closed state.

The Figures show different perspective views of a motorcycle pannier bag 1. In the following description, the indications of direction that have been utilised such as left, right, above, below refer to the illustration of the motorcycle pannier bag 1 in the drawings and are not intended to be restrictive, although they could describe preferred arrangements. Statements such as horizontal and vertical assume that the motorcycle pannier bag 1 is in an upright position on a horizontal base. The designation substantially is intended to include a deviation of up to 5° and preferably of up to 2° in the angle concerned.

The motorcycle pannier bag 1 is formed in essence by a pannier bag body 3 and a suitable cover element 5. The pannier bag body 3 comprises a base and wall elements which form a luggage space. The luggage space is closable by the cover element 5 in known manner and is possibly expandable depending upon the height of the cover element.

Figure 3:
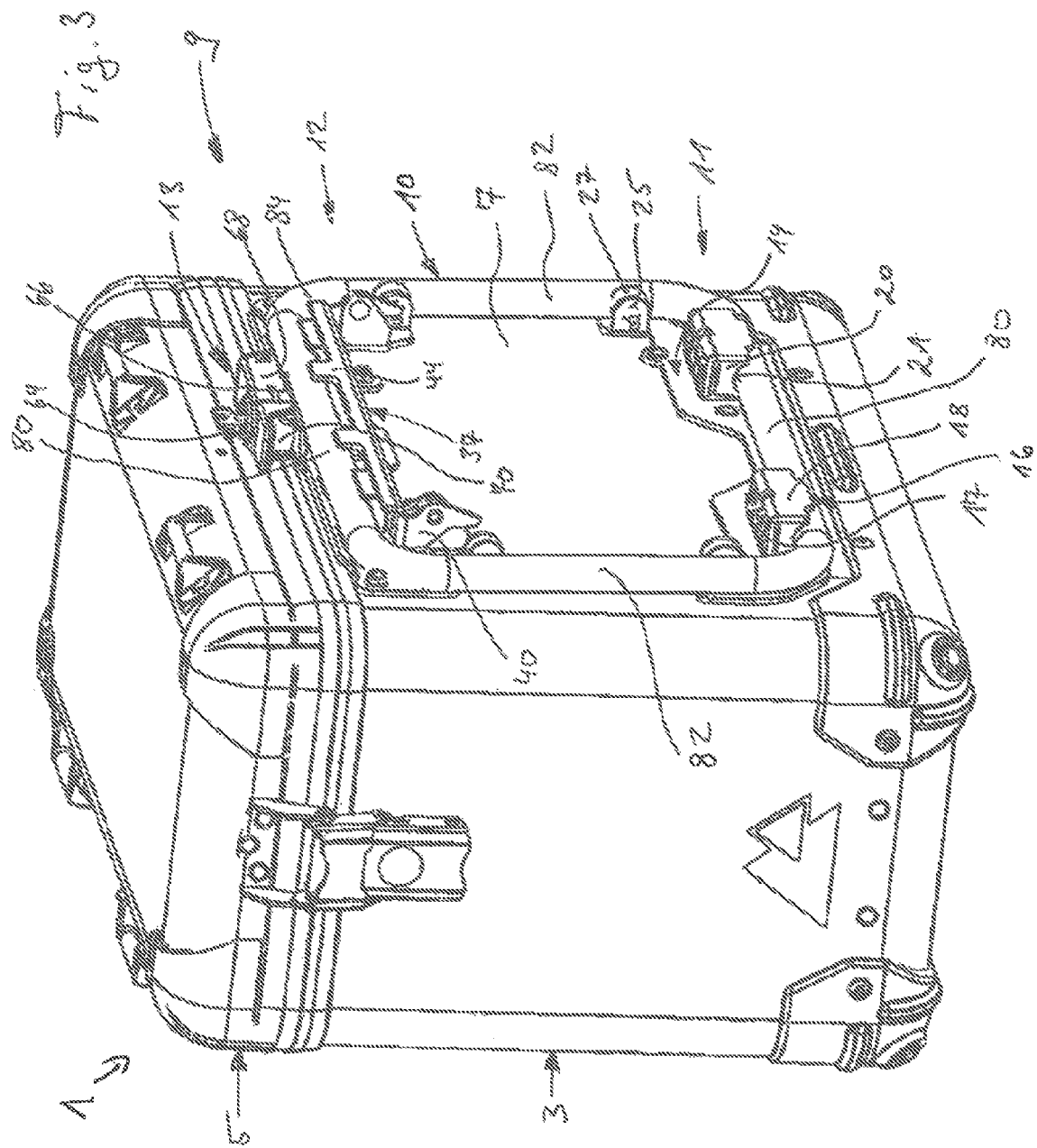
FIG. 3 a perspective rear view of the motorcycle pannier bag in accordance with FIG. 1 with a schematically illustrated vehicle frame element and the mounting device in a closed state.
Figure 4:
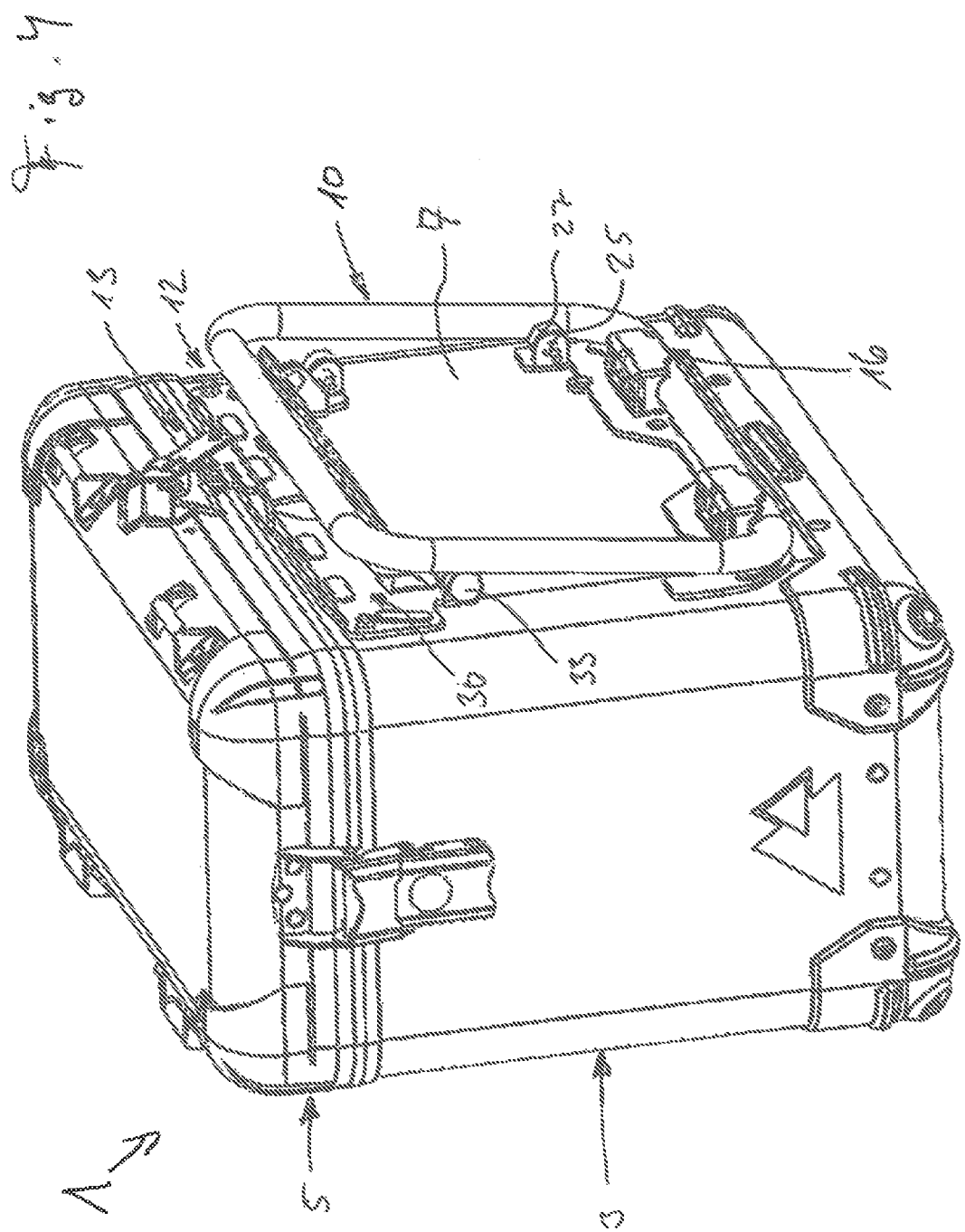
FIG. 4 a perspective rear view of the motorcycle pannier bag in accordance with FIG. 1 with a schematically illustrated vehicle frame element and the mounting device in an opened state.

A mounting device 9 for fixing the motorcycle pannier bag 1 to a not illustrated motorcycle is provided on a rear wall 7 of the pannier bag body 3. The process of attaching it is effected here with the aid of a framework element 10 which is mounted on the motorcycle and is schematically illustrated in FIGS. 3 and 4 as will be described in more detail hereinafter.

In the embodiment illustrated in the Figures, the mounting device 9 consists of a lower supporting unit 11, an upper supporting unit 12 and also a locking unit 13.

The lower supporting unit 11 has a flat baseplate 14 attached to the rear side 7. The baseplate 14 can be attached to the rear side 7 of the pannier bag body 3 by means of suitable fastening parts such as rivets or screws for example. It could however be attached to the rear side in other suitable ways such as by sticking, welding, soldering, brazing etc, for example.

The baseplate 14 has two flanges 16 which each comprise a first flange region 17 and a second flange region 18. The first flange region 17 extends horizontally and is substantially perpendicular to the baseplate 14, The second flange region 13 extends substantially perpendicularly downwardly from a free end of the first flange region 1 and is thus substantially in parallel with the baseplate 14. The flanges 16 are arranged in such a way that their corresponding flange regions 1 and 18 each form a common plane.

The flange regions 1 and 13 in combination with the rear side 7 of the pannier bag body 3 form a downwardly open accommodating space of rectangular cross section. This accommodating space is open at the sides as is perceptible in the Figures. A respective supporting element 20 incorporating a recess 21 is located in this accommodating space. The supporting element 20 is attached to the first 17 or second 18 flange part by suitable means such as screws or rivets for example, namely. In such a manner that the recess 21 points downwardly, i.e. away from the flange part 17, The supporting element 20 is made of a resilient material but it could also be attached to the first flange element in a resilient manner.

It is thereby possible to construct the supporting elements 20 from an inelastic material for example and provide a resilient material between the supporting element 20 and the first flange element 17 which would bias the supporting element 20 in the downward direction.

The recess 21 has a circular-arc-shaped cross section and extends continuously from one end of the supporting element 20 to the other. The recess 21 could however have a shape deviating from that of a circular arc. The recess 21 serves for at least partially accommodating a part of the vehicle frame element 10 as will be described in more detail hereinafter, and it should therefore be adapted to the outer shape of the part of the vehicle frame element 10 that is to be accommodated.

Two further flanges 25 which are located above the flanges 18 and are displaced laterally outwardly therefrom are formed on the baseplate 14. The flanges 25 extend vertically and are substantially perpendicular to the baseplate 14, Outwardly oriented locating elements 27 are attached to the flanges 25 i.e. to the left- and right-hand ends of the baseplate. The locating elements 27 consist of rubber or a hard rubber for example and they are intended to effect a centring process between vertical struts of the vehicle frame element 10 as will be described in more detail hereinafter. For this purpose, the respective outwardly pointing surfaces of the locating elements 27 are arranged at an acute angle to each other in such a way that together they form a conical shape broadening out towards the pannier bag. This can be achieved by appropriately shaping the locating elements 27 or by appropriately angling the flanges 25.

The upper supporting unit 12 in turn has a plate element 30 which is fixed firmly to the rear wail 7 of the pannier bag body 3 in an appropriate way in like manner to the plate element 14. In the illustrated embodiment, the plate element is attached by means of screws which, by virtue of suitably elongated holes in the plate element 30 and/or in the rear wail 7 of the pannier bag body 3, permit the spacing between the lower supporting unit 11 and the upper supporting unit 12 to be adjusted to a certain extent. Such provision for adjusting the spacing could also be provided in the region of the lower plate element 11 of course, and it serves for enabling the mounting unit 9 to be matched to different framework geometries. The plate element 30 is substantially flat but it does however incorporates a section 31 at its upper end that is inclined away from the pannier bag body and it also has a plurality of flanges which will be described in more detail hereinafter.

The plate element 30 comprises flanges 32 which carry locating elements 33. These can be constructed and arranged in the same way as the flanges 25 and the locating elements 27 of the lower supporting unit 11 and are also preferably in alignment wherewith, it is preferred that the outwardly pointing surfaces of the lei-hand and the right-hand locating elements 27, 33 lie in a common vertically extending plane.

The plate element 30 comprises two laterally spaced flanges 35 which extend vertically and are substantially perpendicular to the plate element 30. An outwardly extending axle 36 is provided at the free ends of each of the flanges 35, i.e. spaced away from the rear wall 7 of the pannier bag body 3. These axles can be attached to each flange 35 in an appropriate way. The axles 36 on the respective flanges 35 are aligned such as to be coaxial to each other. Although the Figures show that a separate axle 36 emerges from each flange 35, it is of course also possible to provide a continuous axle which extends through both flanges 35 and is carried thereby. The axles 36 could also be attached to the flanges 35 such that they point inwardly.

Figure 2:
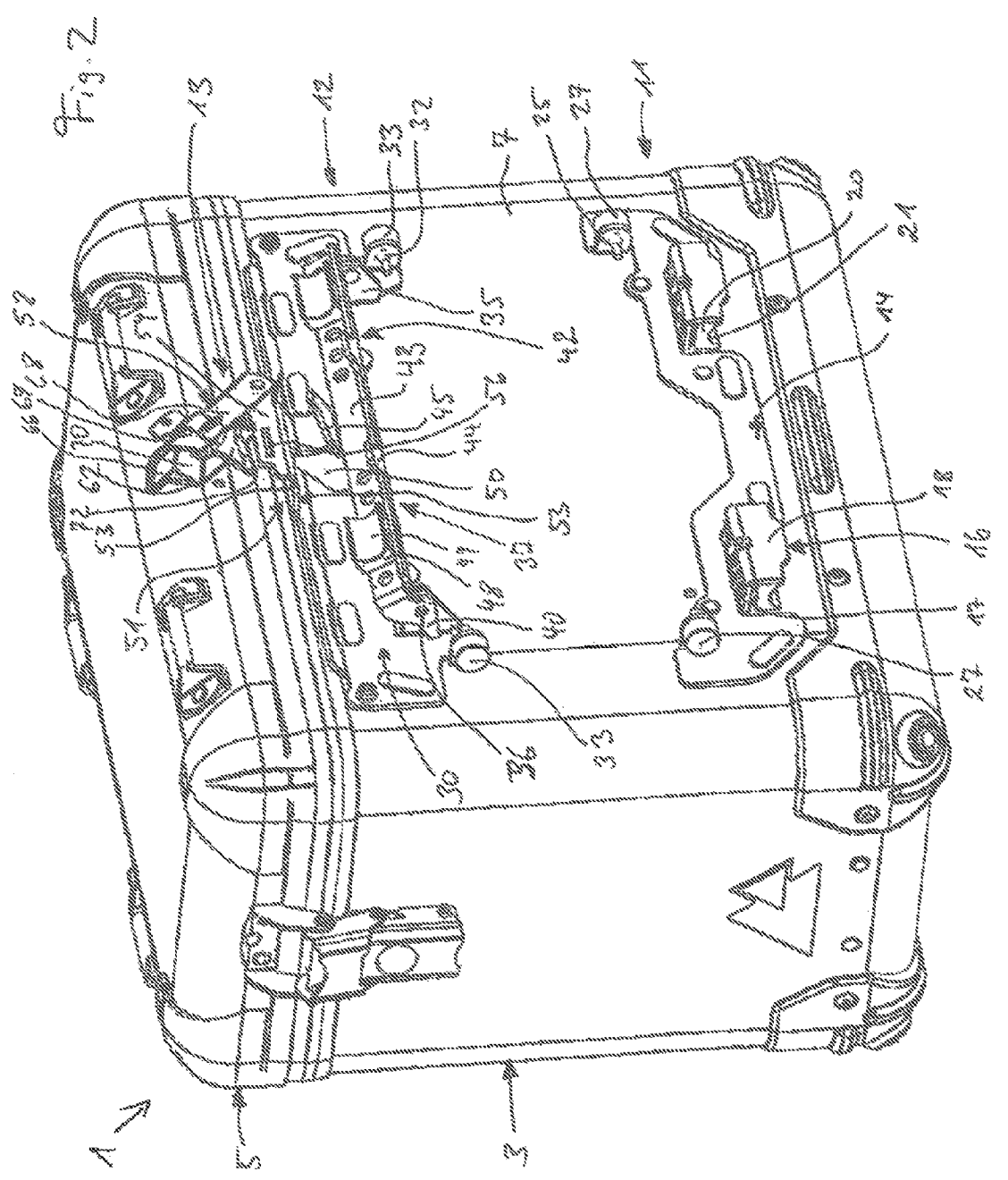

A pivotal bracket 37 is seated on the axles 38 and mounted in pivotal manner. The pivotal bracket 37 is pivotal between an opened position as is illustrated in FIG. 2, and a closed position as is illustrated in FIG. 1.

The pivotal bracket 37 has two substantially vertically extending end regions 40 and also a substantially horizontally extending middle section 42. The end regions 40 are arranged in such a way that they grip round the flanges 35 and they each comprise an accommodating opening for accommodating one of the corresponding axles 36. The free ends of the end regions 40 are arranged and formed in such a way that they limit a pivotal movement of the middle section 42 of the pivotal bracket 37 away from the rear wall 7 of the pannier bag body 3 by resting on the plate element as is perceptible from FIG. 2. They thus serve as stop elements.

The middle section 42 of the pivotal bracket 37 has a horizontally extending base portion 43, a first upwardly extending flange 44 that is substantially perpendicular to the base portion 43 and a second upwardly extending flange 45 that is perpendicular to the base portion 43.

A plurality of spaced mounting holes 47 for supporting elements 48 are provided in the base portion 43. The mounting holes 47 provide different fixing points for the supporting elements 48 as the skilled person can appreciate. Provision can thereby be made for mounting the supporting elements 48 so as to match the vehicle frame element 10.

The supporting elements 48 can be of the same type as the supporting elements 20 in the region of the lower supporting unit 11. The supporting elements 48 again comprise a recess 49 having the shape of a circular arc. Herein, the supporting elements 43 are mounted on the middle section 42 of the pivotal bracket 37 in such a manner that the corresponding recesses 49 point upwardly in the closed position of the pivotal bracket 37 (neighbouring the rear wall 7 of the pannier bag body 3). in particular, the recesses 49 point in a direction rotated through 180 degrees with respect to the recesses 21 of the supporting elements 20 when the pivotal bracket 37 is in the closed position. This can best be seen in the illustration in accordance with FIG. 6, in the opened position of the pivotal bracket, the recesses 49 are inclined upwardly (away from the pannier bag body 3). This can best be seen in the illustration in accordance with FIG. 2.

Furthermore, in the illustration in accordance with FIG. 6, it can be seen that a mid-point of the recesses 49 is located closer to the rear of the pannier bag body 3 than the respective axles 36 for the pivotal bracket 37 in the closed position of the pivotal bracket 37. As seen from the lower supporting elements, the supporting elements 48 are moved over the rotational axes of the axles 36 when the pivotal bracket 37 is moved from the opened position into the closed position. Consequently, the spacing between the lower supporting elements 21 and the upper supporting elements 48 is initially slightly increased and then reduced again during the pivotal movement, as the skilled person can appreciate.

The flange 44 is formed on a side of the base portion 43 pointing away from the rear wall 7 of the pannier bag body 3 and it offers lateral support for the supporting elements 48. The flange 44 comprises two raised portions which protrude beyond the supporting elements 48 in order to provide, if necessary, a lateral stopping means for a strut of the vehicle frame element 10 in the closed position of the pivotal bracket as can be seen in FIG. 3.

The flange 45 is formed approximately centrally on the side of the base portion 43 pointing towards the rear wall 7 of the pannier bag body 3 and the height thereof is such that it is higher than that of the raised portions of the flange 44. The flange 45 has a tapering shape extending upwardly from a broader base so as to form an inclined shape. An aperture 50 corresponding to the flange 45 is provided in the baseplate 30 so that the flange 45 is substantially accommodated in the baseplate 30 in the closed state of the pivotal bracket 37 as can be seen in FIG. 1.

Figure 5:
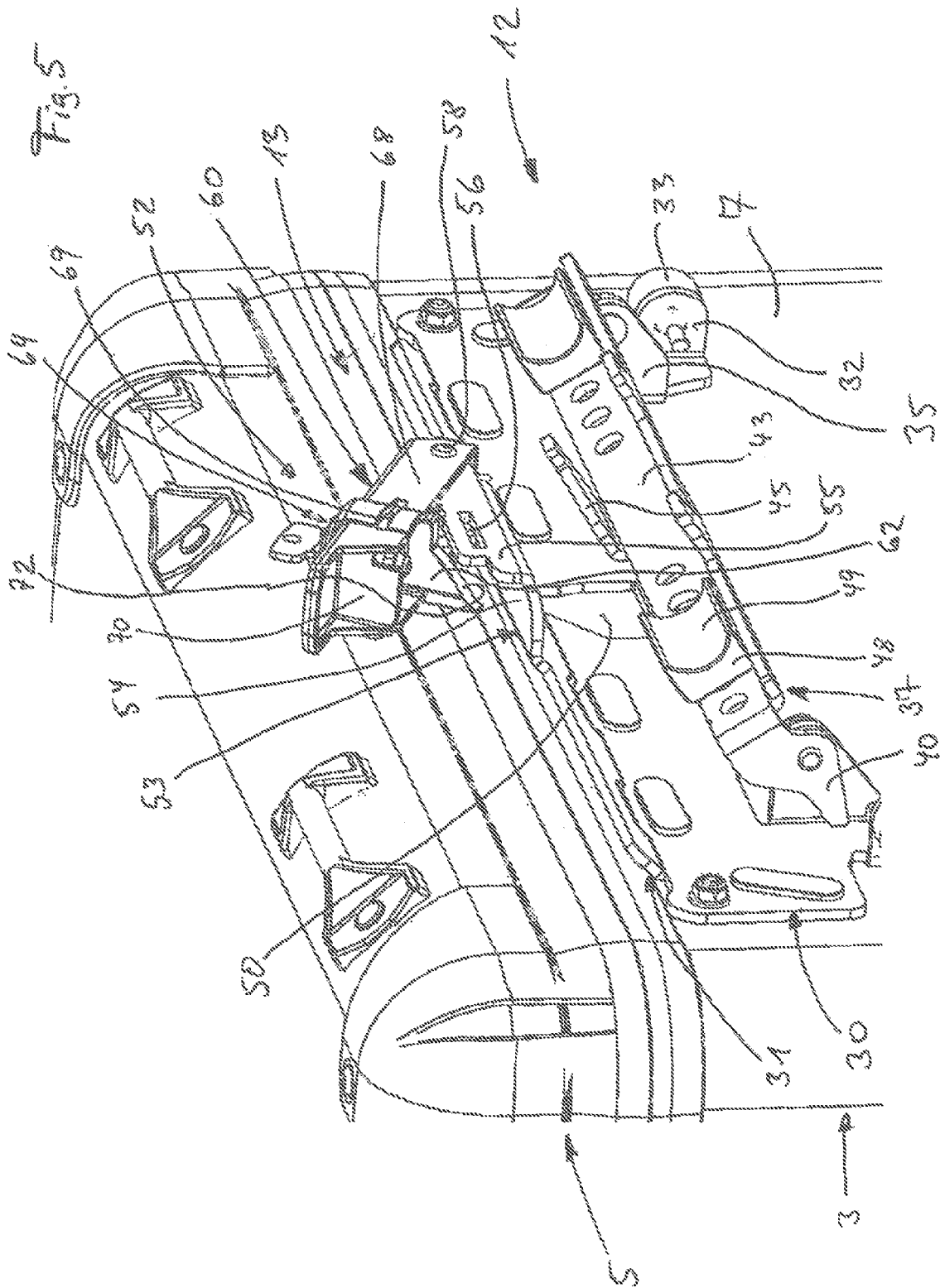
FIG. 5 an enlarged partial view of the motorcycle pannier bag in accordance with FIG. 2 with the mounting device in an opened state and an opened looking unit.

The locking unit 13, which is best seen in an opened position in FIG. 5, is formed from a rigid carrier part 51 and a movable locking clamp 52.

The rigid carrier part 51 is formed by a flange 53 of the baseplate 30. The flange 53 is formed at an upper end of the inclined section 31, namely, approximately centrally and thus above the aperture 50. The flange 53 has a first flange region 54 and a second flange region 55. The first flange region 54 extends horizontally and is substantially perpendicular to the baseplate 30. The second flange region 55 extends from a free end of the first flange region 54 substantially perpendicularly upwardly and is thus substantially parallel to the baseplate 30. A slot extending perpendicularly to the baseplate 30 is formed in the first flange region 54 although this cannot be perceived in the Figures since it is covered by the second flange region 54 in each of these views. This slot is located in a position aligned with the aperture 50 in the baseplate 30.

A horizontally extending slot 56 is formed in the second flange region 55. A swivel pin 58 which carries the locking clamp 52 in pivotal manner is accommodated in the second flange region 55 at the right-hand end thereof. The swivel pin 58 is preferably accommodated in a further not illustrated flange of the flange 53 which extends in parallel with the second flange region 55 or in an alternative carrying element in order to support the swivel pin at at least two spaced points.

The looking clamp 52 comprises a main body 80, a not shown biasing unit, a latching member 62 and a cylinder lock 64. The main body 60 has a middle section 66 and also two side parts 63 which are formed in one-piece from a suitable material such as stainless steel for example. The side parts 68 extend substantially perpendicularly relative to the middle section 66 so that they are U-shaped in cross section. A circular opening for inserting the cylinder lock 64 is formed in the middle section 66. A circular bulge is provided in the region of the cylinder lock 64 in one side part 68 which, in the mounted state of the locking clamp, points away from the pannier bag body 3. Furthermore, a horizontal slot 69 extends within this region and also beyond it in the side part 68 for accommodating a latching element of the cylinder lock 64.

At the right-hand ends of each of the side parts 68, there are provided openings for accommodating the swivel pin 58 which passes there-through. The swivel pin 58 is thus in a position to bear the locking clamp 52 such that if is pivotal with respect to the flange 53. In particular, the locking clamp 52 is pivotal between a closed position such as is shown in FIG. 1 for example and an opened position such as is shown in FIG. 2 for example.

At the loft-hand end thereof, the side parts 68 of the main body 60 are each set back with respect to the middle section 66 and are tapered, namely. In such a manner that the side parts 68 widen out towards the middle section 66. The middle section 63 thereby forms a protruding operating surface which a user can grip for the purpose of manually swivelling the locking clamp 52.

Furthermore, the main body 60 comprises an optional reinforcement element 70 which extends transversely relative to the side walls 68 and substantially closes the U-shaped portion of the main part of the body 60 on the left-hand side. The reinforcement element 70 can be fixed in the main body 60 in a suitable manner, and in particular by welding, soldering or brazing. Alternatively, it is also possible to construct the reinforcement element 70 as a unitary part, e.g. a cast part, that is formed in one-piece with the main part of the body 60. Neighbouring the side wall 68 incorporating the circular bulge, the reinforcement element 70 has a recess for at least partially accommodating the second flange region 55 of the flange 53 when the locking clamp 52 is in the closed position, in the region of the rotational axis 58 or between the rotational axis 58 and the cylinder lock 64, there is provided a not shown biasing unit which biases the locking clamp 52 into the closed position. Such biasing units, which consist of a spring for example, are long known in the state of the art and consequently do not need to be described here in more detail.

Furthermore, the locking clamp 52 comprises a latching member 82 which extends transversely relative to the side parts 68 of the main body in a similar manner to the reinforcement element 70, and it is connected to the main body 60 in a suitable way. The latching member extends downwardly beyond the side parts 68 of the main body 60 and is arranged in such a way that, in the closed state, it extends through the above mentioned but not illustrated slot in the first flange-part 54 of the flange 53 and protrudes downwardly from the first flange-part 54.

The latching member 62 comprises a first vertically extending side that points towards the pannier bag in the closed state and serves as a locking means for the flange 45 of the pivotal bracket 37. On the side thereof remote from the pannier bag body 3, the latching member 62 has an inclined guidance surface 72 for engaging with the flange 46 during a movement of the pivotal bracket 37 from the opened position into the closed position. The inclined guidance surface 72 is formed in such a way that, upon a movement of the pivotal bracket 37 from the opened position into the closed position, the flange 45 will cause the locking clamp 52 to swivel automatically from a closed position into an opened position. When the locking clamp 37 is in the completely closed position, the flange 45 releases the latching member 62 so that the locking clamp 52 is returned automatically to the closed position by the not shown biasing unit. The latching member 62 now blocks a movement of the flange 45 in the opposite direction by means of the side thereof pointing towards the pannier bag body 3, and thus blocks a movement of the pivotal bracket 37 from the closed position. Naturally, it is also possible to move the locking clamp 52 manually into the opened position during the corresponding pivotal movement of the pivotal bracket 37 and then to let it return to the closed position. In order to release the pivotal bracket 37, the locking clamp 52 must be moved manually into the opened position so that the pivotal bracket 37 can swivel back into the opened position.

The cylinder lock 64 is accommodated in the opening in the middle section 66 of the main body 60 and extends substantially into the U-shaped section of the main body, it is fixed therein in a suitable manner. A latching bar of the cylinder lock 64 can be moved into and out of the slot 56 in the second flange pad 55 and the slot 69 in a side part 66 by means of a key. As the skilled person can perceive, it is thereby possible to lock the looking unit 13 in the closed state in order to prevent unauthorized opening of the locking clamp 52 and thus removal of the motorcycle pannier bag 1 from the vehicle frame element 10.

The vehicle frame element 10, to which the motorcycle pannier bag 1 is to be fastened, will now be briefly described. The vehicle frame element 10 consists in essence of two horizontal extending struts 80 of rounded cross section and also two vertically extending struts 82 having a rounded cross section. The struts 80, 32 are connected to one another by rounded-off corner connectors 84 so that they form a substantially rectangular shape.

The process of attaching the motorcycle pannier bag 1 to the vehicle frame element 10 will now be described in more detail with reference to the Figures.

The motorcycle pannier bag 1 is initially seated on the lower horizontally extending strut 80 of the vehicle frame element 10 such that is inclined. This is done in that the lower supporting elements 20 are placed on the lower horizontally extending strut 80 at an angle. Herein, the motorcycle pannier bag 1 should be placed such that it is located approximately centrally between the vertically extending struts 82 of the vehicle frame element 10.

The pivotal brackets is in a swung-out position. By swivelling the motorcycle pannier bag 1—on the lower strut 80—from the inclined position into an upright position, the upper supporting elements 48 will automatically engage with the upper horizontally extending strut 80. The upper vertically extending strut 80 is accommodated in the recess 49 in the upper supporting element 48. Upon further swivelling of the motorcycle pannier bag 1, the pivotal bracket 37 is now carried along therewith and is moved automatically from the opened position into the closed position. The upper supporting elements 48—as seen from the lower supporting elements 20—thereby cross the rotational axes 56 of the pivotal bracket 37, Consequently, in the course of this swivelling process, a clamping force which is exerted by the supporting elements 20, 48 on the horizontally extending struts 30 firstly increases and then drops down again. Naturally, a basic tension and a clamping force for holding the motorcycle pannier bag 1 are maintained in the closed position.

During the pivotal movement of the pivotal bracket 37, the locking clamp 52 is automatically moved from a closed position into an opened position as previously described, and then, in the closed position of the pivotal bracket 37, returns to the closed position. This happens automatically during a corresponding pivotal movement of the motorcycle pannier bag 1 on the lower strut 80. The motorcycle pannier bag 1 is thus automatically locked in the upright position. Naturally, it is also possible for the locking clamp 52 to be operated manually. Furthermore, the motorcycle pannier bag 1 is centred and stabilized with respect to the vertically extending struts 82 by the locating elements 27, 33.

In order to release the motorcycle pannier bag 1, the locking clamp 52 is simply moved manually into its opened position and the motorcycle pannier bag 1 is then swung outwardly. Due to the fact that during this pivotal movement the upper supporting elements 48 have to be moved back again over the rotational axes of the pivotal bracket 37 as seen from the lower supporting elements 20, the motorcycle pannier bag 1 does not automatically fall outwardly, but must be actively swung out. The force required for this action can be set by suitable selection of the geometry as the skilled person will perceive. In other words, the motorcycle pannier bag 1 is initially held in the upright position even when the locking clamp 52 is opened so that unintentional tipping thereof with the possibility that the motorcycle pannier bag 1 will fall out as a result thereof is prevented.

The motorcycle pannier bag 1 according to the invention thus enables simple attachment to a vehicle frame element 10 and also simple release therefrom without the need to open the pannier bag. Furthermore, both the mounting and the release processes can easily be effected with one hand. Due to the fact that the looking clamp 52 may be locked up, the motorcycle pannier bag 1 can also remain in position over a long period without fear that it will be removed unlawfully.

Although the invention has been described in detail in combination with a motorcycle pannier bag, it should be mentioned that it can also be used in combination with any other transportation devices for attaching them to a vehicle frame element. In particular roof boxes and bicycle carriers are to be taken into consideration. Naturally thereby, they could also be mounted such that they are otherwise aligned and in particular between horizontally spaced struts. Further, the term vehicle frame element comprising at least two parallel struts has a broad meaning and shall encompass any arrangement of two parallel struts fixed to a vehicle, even if these two struts do not form an integrated element, such as in the case of automotive roof rails or roof racks.

The invention claimed is:

1. A transportation device (1) for fixing to a vehicle frame element (10) comprising at least two parallel struts, wherein the transportation device (1) comprises the following:

a luggage accommodating region;

at least one side part (7);

at least one first supporting element (20) which is fixed to the side part (7) and comprises at least one first recess (21) for at least partially accommodating a first one of the struts, wherein the first supporting element (20) is fixed rigidly to the side part (7) and the first recess (21) points in a first direction;

at least one second supporting element (48) which is fixed to the side part (7) and comprises a second recess (49) for at least partially accommodating a second one of the struts, wherein the second supporting element (48) is fixed to the side part (7) such as to be pivotal about a swivel pin (36) in order to be movable between an opened and a closed position, wherein, in the closed position of the second supporting element (48), the second recess (49) points in a second direction that is opposed by 180° to the first direction, and wherein, upon a movement between the opened and the closed position, the second supporting element (48) is moved over the swivel pin (36) as seen from the first supporting element (20);

at least one latching member (45) which is fixed in a rigid relationship with the second supporting element (48) and is pivotal therewith on the side part (7);

at least one locking unit (13) which is fixed to the side part (7) and comprises a stationary part (51) and a pivotal part (52), wherein the pivotal part (52) is movable between a closed position and an opened position, and in the closed position, is configured to lock the latching member (45) in a closed position of the second supporting element.

2. The transportation device (1) according to claim 1, wherein the pivotal part (52) of the locking unit (13) is biased into the closed position and is mounted on the side part (7) in such a way that it contacts the latching member (45) upon movement of the second supporting element (48) from the opened position into the closed position, then moves into an opened position and subsequently returns automatically to the closed position in which it locks the latching member (45).

3. The transportation device (1) according to claim 1, wherein the locking unit (13) comprises a lock (64) which is arranged in such a way that it prevents a movement between the stationary part (51) and the pivotal part (52) in a locked position and permits movement in an opened position.

4. The transportation device (1) according to claim 1, wherein the locking unit (13) and also the first and second supporting elements (20, 48) are fixed to the same side of the side part (7) which points away from the luggage accommodating region.

5. The transportation device (1) according to claim 1, wherein the latching member (45) and the second supporting element (48) are attached to a common pivotal bracket (37).

6. The transportation device (1) according to claim 1, wherein at least one of the first and/or second supporting elements consist at least partially of a resilient material in order to permit a movement of a surface of the recess in at least one of the first and second directions.

7. The transportation device (1) according to claim 1, wherein the transportation device is a motorcycle pannier bag.

8. A vehicle incorporating a vehicle frame element (10) comprising at least two parallel struts, and a transportation device (1) according to claim 1, mounted on the vehicle frame element (10).

9. The vehicle according to claim 8, wherein the vehicle is a motorcycle.

* * * * *